Figure 1:
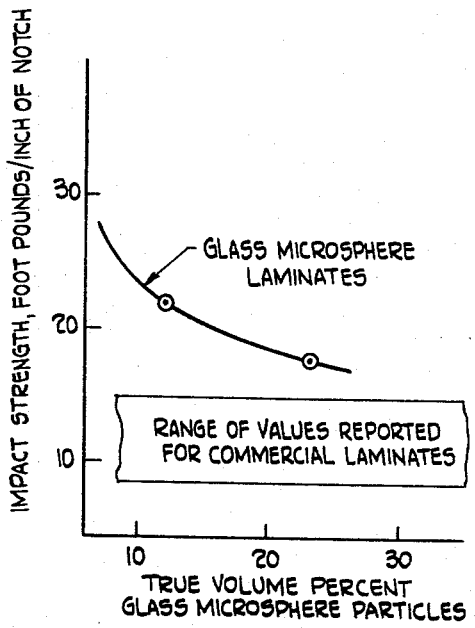

Oct. 4, 1966

H. E. ALFORD 3,276,895

FIBROUS REINFORCING MATERIALS HAVING
IMPROVED SURFACE CHARACTERISTICS

Filed May 31, 1962

3 Sheets-Sheet 1

INVENTOR.
HARVEY E. ALFORD
BY
Schramm, Kramer & Sturges
ATTORNEYS.

Oct. 4, 1966 H. E. ALFORD 3,276,895
FIBROUS REINFORCING MATERIALS HAVING
IMPROVED SURFACE CHARACTERISTICS
Filed May 31, 1962 3 Sheets-Sheet 2

INVENTOR.
HARVEY E. ALFORD
BY
Schramm, Kramer & Sturges
ATTORNEYS.

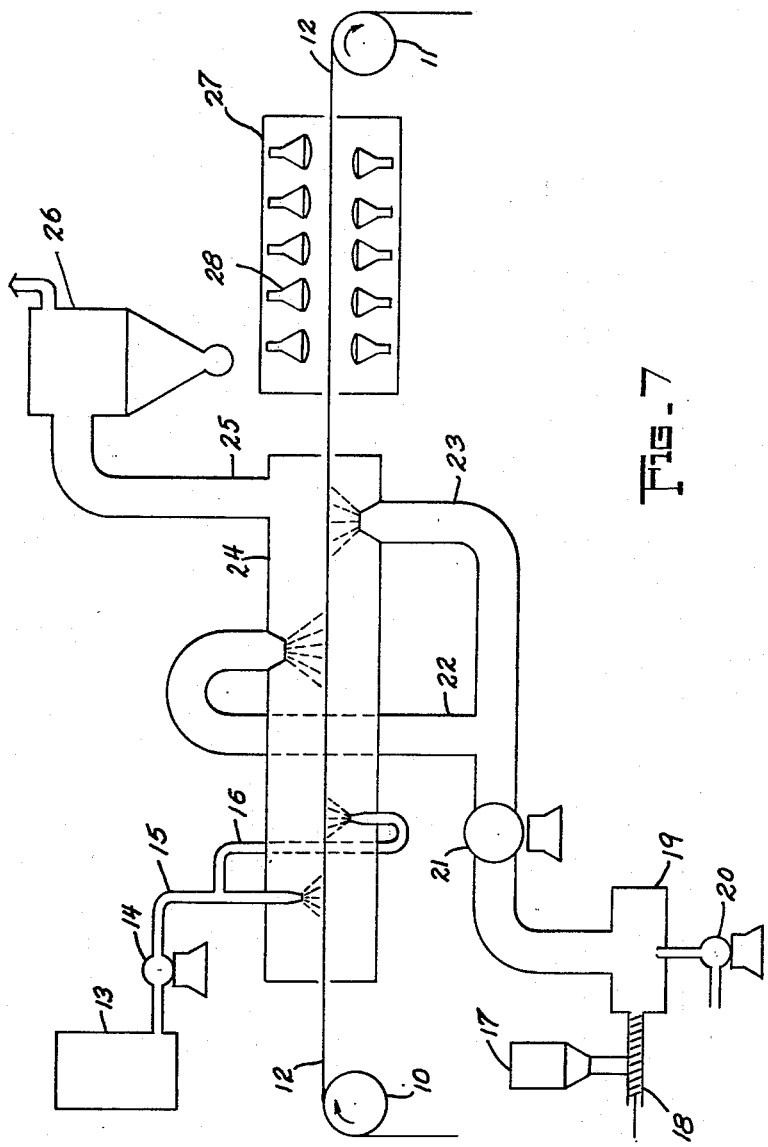

United States Patent Office 3,276,895
Patented Oct. 4, 1966

3,276,895
FIBROUS REINFORCING MATERIALS HAVING IMPROVED SURFACE CHARACTERISTICS
Harvey E. Alford, Amherst, Ohio, assignor to The Standard Oil Company, Cleveland, Ohio, a corporation of Ohio
Filed May 31, 1962, Ser. No. 199,047
3 Claims. (Cl. 117—26)

The present invention relates to fibrous materials modified to increase roughness of their surfaces for use in reinforced plastic compositions. Another aspect of the invention relates to a method of making such fibrous materials having increased surface roughness.

Plastic compositions reinforced with fibrous materials differ from most other materials of construction in that they combine two essentially different materials, i.e., the fibrous material and a resin, into a generally uniform composition. In the latter respect, they are somewhat analogous to reinforced concrete which combines concrete with steel rods, but in reinforced plastics, the fibrous materials are generally much more evenly distributed through the mass and the ratios of fibers to resins is much higher than the ratio of steel to concrete in reinforced concrete.

In the design of such reinforced plastics, it is necessary to take into account the combined action of the fiber and the resin. In designing structural members which are made from reinforced plastics containing fibrous materials, certain important assumptions must be made. First, and most fundamental, is that the two materials act together and that the stretching, compression and twisting of the fibers and the resin under load are the same, i.e., the strains in the fiber and resin are equal. This assumption necessarily implies that a good bond exists between the resin and fiber either inherently or because of the surface treatment of the fiber. The bond need not be absolutely continuous if the points of bond are closely enough spaced to develop a combined action of resin and fiber which is basic to engineering design of these materials. The bond whether intermittent or continuous must be sufficiently strong to substantially preclude slippage between the resin and the fiber and must prevent wrinkling of the fiber.

It is therefore one object of this invention to provide a fibrous material for use in reinforced plastic compositions which has improved surface characteristics so as to insure a strong bond between the resin and the fibers so as to prevent slippage therebetween.

In brief, the present invention comprises a fibrous material having a plurality of small hollow glass microspheres bonded to its surface. Another aspect of the invention relates to a process of producing such fibers. The process is carried out by applying an adhesive agent to the surface of a fibrous material, next applying a coating of hollow glass microspheres to said adhesive-bearing surface, and finally curing the adhesive agent so as to permanently bond the microspheres to the surface of the fibrous material.

Figure 2:
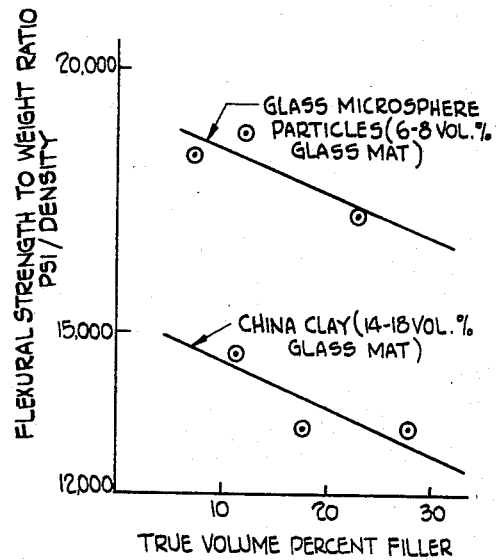
Figure 3:
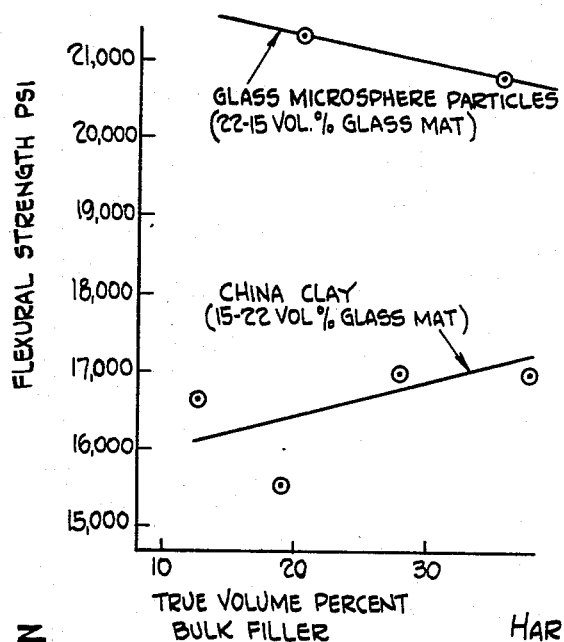
Figure 4:
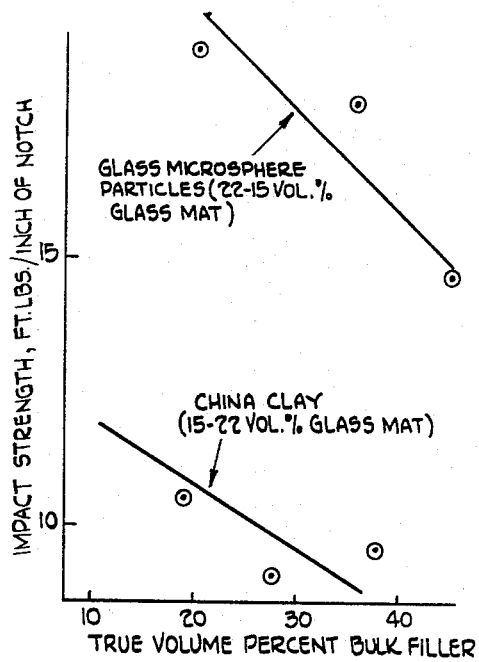
Figure 5:
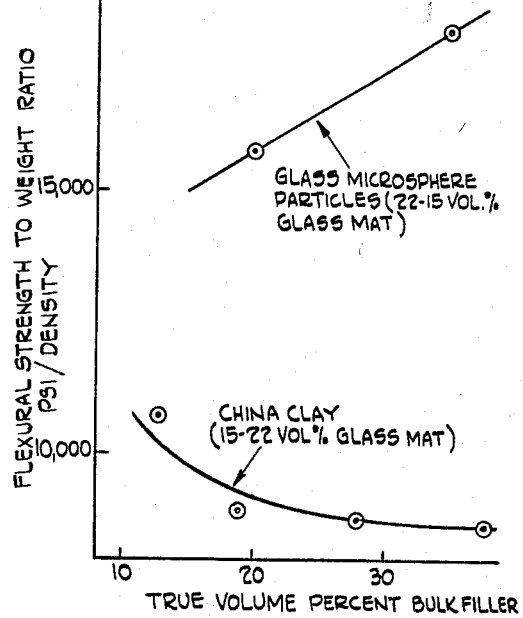
Figure 6:
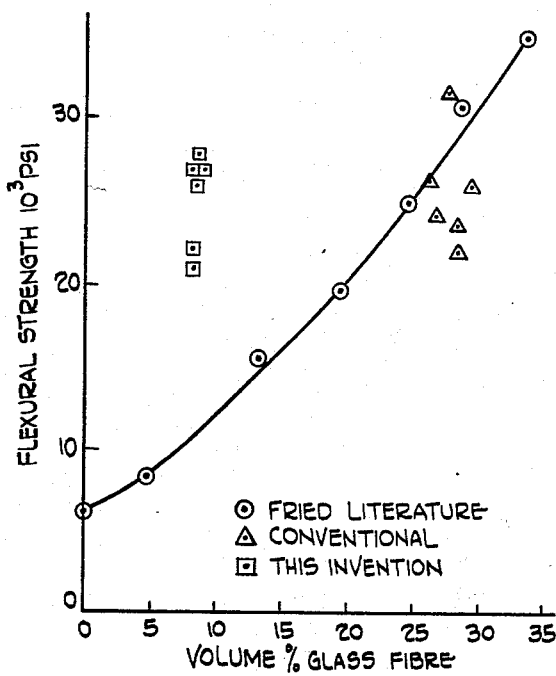

Referring now to the accompanying patent drawings:
FIG. 1 is a graph comparing the impact strength of commercial glass fiber laminates with laminates manufactured with glass fiber produced in accordance with the process of this invention;
FIG. 2 is a graph comparing the flexural strength to weight ratio of a polyester resin glass mat laminates prepared with glass microspheres and the same type of laminate prepared with china clay;
FIG. 3 is a graph comparing the effect of bulk fillers on the flexural strength of phenolic laminates;
FIG. 4 is a graph comparing the effert of bulk fillers on the impact strength of phenolic laminates;
FIG. 5 is a graph comparing the effect of bulk fillers on the flexural strength to weight ratio of phenolic laminates;
FIG. 6 is a graph comparing the effect of various glass fibers on the flexural strength of laminates;
FIG. 7 shows the process of this invention in schematic outline and this figure will be described more fully below.

The invention is applicable to any of the fibrous materials which are commonly employed to reinforce plastic compositions. Such materials include glass fibers, natural fibers (such as wool, cotton, linen and the like), synthetic fibers (such as polyamides and polyesters), asbestos, jute, and metal fibers.

The products made by the process of the invention may be combined with resins of either the phenol-aldehyde type or the polyester type in the production of plastic laminates. The phenol-aldehyde resins employed in the production of plastic laminates are well known. These resins are conventionally made by the condensation of phenols or substituted phenols with aldehydes such as formaldehyde, acetaldehyde and furfural. The preferred phenol compounds are those which have at least three active hydrogen atoms. The condensation takes place in the presence of a catalyst such as sodium carbonate or ammonia and in the presence of excess aldehyde. The condensation goes through three stages, conventionally known as the A, B and C stages. The A stage resin is thermoplastic and alcohol-soluble. The B stage resin softens and is moldable upon the application of heat and pressure, but it does not completely melt. The C stage resin is infusible, and completely insoluble, due to further polymerization. In the production of laminates, it is generally the B stage resin that is employed, and the molding operation is used to convert the B stage to the C stage. Where an acid catalyst is employed for the condensation reaction and there is excess phenol in the reaction medium, the condensation proceeds more rapidly, and yields a thermoplastic product which can thereafter be rendered infusible either by the addition of more aldehyde and an alkaline catalyst or by the addition of an amine cross-linking agent. As is well known, the properties of the final phenol-aldehyde resin and thus of the laminate depend to a very great extent upon the nature of the starting materials employed. The phenol-aldehyde resins can be modified by the addition of various plasticizers and other monomers or polymers.

The polyesters applicable for use in conjunction with the treated fibrous material are of the type known to the art. Generally, they may be described as the polycondensation products of dibasic acids with dihydric alcohols. The polyesters used in the production of laminates of the type contemplated by this invention are of the unsaturated type which are produced when either or both of the dibasic acid and the dihydric alcohol reactants contain non-aromatic unsaturation. Conventionally, the unsaturation is introduced by the use of unsaturated dibasic acids, such as, for example, maleic or fumaric acids. As a result of this non-aromatic unsaturation, they can be cross-linked or copolymerized with another unsaturated, copolymerizable monomer.

In the preparation of the unsaturated polyesters, it is generally the practice to conduct the esterification step under conditions that will substantially prevent any tendency toward polymerization across the double bonds. This is generally accomplished by controlling the temperature of the esterification and the use of inhibitors of addition polymerization.

Oxygen is generally excluded from the reaction system in order to permit the reaction to proceed for enough time to yield a resin of low acid number and low viscosity. Generally, the reaction is carried out in an atmosphere of an inert gas such as nitrogen or carbon dioxide.

The most common acids employed in the manufacture of polyester resins are maleic and fumaric acids. In general, any unsaturated dicarboxylic acids containing non-aromatic unsaturation can be employed including citraconic acid, itaconic acid, glutaconic acid, alpha-hydromuconic acid, 2-octenedioic acid, 4-amyl-2,5-heptadienedioic acid, 3-hexynedioic acid, 3-hexene-2,2,3,4-tetra-carboxylic acid, endomethylene tetrahydrophthalic acid and hexachloroendomethylene tetrahydrophthalic acid. Alternately, acid anhydrides, such as maleic anhydride, may be used in place of the acids.

It is sometimes desirable to reduce the amount of unsaturation present in the polyester in order to reduce the degree of cross-linking of the final product. This is generally done by mixing the unsaturated acid with a quantity of a saturated dibasic acid or acid anhydride. The exact proportions of saturated to unsaturated acid will depend upon the properties desired in the final product. Generally, from about 10% to about 50% of the total amount of acids employed in the esterification reaction can be saturated. The saturated acids most commonly employed in conjunction with the unsaturated acids in the formation of polyester resins are phthalic and adipic acids or anhydrides, but other saturated dicarboxylic acids or anhydrides, aliphatic or aromatic, including malonic, succinic, glutaric, pimelic, and terephthalic acids and anhydrides can be employed.

The alcohol component will generally be saturated, and preferably will be a glycol, such as ethylene glycol, propylene glycol, diethylene glycol, dipropylene glycol and tetramethylene glycol. Higher molecular weight glycols can also be employed, such as decamethylene glycol.

If desired, unsaturated alcohols can be used, including 2,5-dimethyl-3-hexyne-2,5 diol; 3,6-dimethyl-4-octyne-3,6-diol; and 2 butene-1,4-diol. After the esterification reaction takes place, the unsaturated polyesters are generally mixed with a monomeric copolymerizable compound. The temperature and the reactivity of both the polyester and the cross-linking agent as well as the amount of cross-linking agent will determine the speed of the cross-linking reaction. Generally, from about 20 to about 40 parts by weight of cross-linking agent are employed per hundred parts by weight of polyester. Representative cross-linking agents include styrene, divinyl benzene, 2-methyl styrene, chloro- and fluoro-styrenes, vinyl toluene, diallyl phthalate, methyl methacrylate, triallyl cyanurate, allyl diglycolate, diallyl phenyl phosphonate, diethylene glycol-bis-(allyl carbonate), 1,2 propylene glycol-bis-(allyl carbonate), allyl carbonate and methallyl maleate. Of these cross-linking agents, styrene and diallyl phthalate are usually used. The choice of cross-linking agents selected will depend upon the use. Styrene or methyl methacrylate are generally employed where rapid cross-linking is desired. Diallyl phthalate is employed where slower curing properties are required, and is more often employed where it is intended to store the resin composition in the uncured state for relatively long periods of time. Allyl diglycolate tends to yield transparent final products.

Where desired, a catalyst, also known as an accelerator or promoter can be added to the polyester prior to the fabrication step. The usual catalysts are the organic peroxides such as, for example, benzoyl peroxide and dicumyl peroxide. In order to increase the storage life of the mixture containing the cross-linking agent, various room temperature stabilizers are often employed. These stabilizers, in effect, raise the temperature required for the cross-linking reaction to take place. The most common of the stabilizers are the salts of substituted hydrazines, the quaternary ammonium salts and the substituted para-benzoquinones.

Optionally, mold release agents can be added to the composition either before or after the addition of cross-linking agents. There are generally four types of such mold release agents, the film type such as polyvinyl alcohol and cellophane, film forming agents, including the alginates methyl cellulose and polyvinyl alcohol salts, waxes such as carnauba wax and lubricants such as graphite, sulfate esters, alkyl phosphates and silicones.

When glass fibers are treated in accordance with this invention, they may be used in the form of chopped strands, rovings, non-woven mats, milled fibers, yarns, woven cloths and woven rovings. Hence, the invention may be applied to any of the numerous kinds and forms of fiber glass which are customarily employed in the manufacture of reinforced plastic compositions.

As the adhesive agent which is employed in the practice of this invention, any material which will bond the glass microspheres to the fibrous material may be employed. Typical cements would include polyesters, acrylics, silicones, epoxies, phenolics, sucrose, rubber, sodium silicate, colloidal silica, and the like. Examples of suitable adhesive agents are a vinyl plastisol, organosol, or latex containing a minor amount of benzoyl peroxide as a catalyst, a ketonic solution of an epoxy resin containing a minor amount of diethylene triamine as a catalyst, and a phenolic resin containing a minor amount of hexamethylene tetramine as a catalyst.

The hollow lightweight glass microspheres which are deposited on the surface of the fibrous material may have diameters in the range of 5 to 5,000 microns and wall thicknesses of from 0.5% to 10% of their diameters. The gas density of the microspheres will be in the range of 0.1 to 0.75. The hollow glass microspheres and the method by which they are prepared are more fully described in co-pending application Serial No. 862,436 now U.S. Patent 3,030,215, and U.S. Patents 2,978,339 and 2,978,340.

It is a common practice in the manufacture of reinforced plastics to add a certain amount of filler material to such compositions along with the fibrous material and resins. One of the advantages of this invention is that when the fibrous materials which have been treated with microspheres in accordance with this invention are used in the preparation of reinforced plastic compositions, the need for such fillers is diminished in greater proportion to the amount of microspheres which have been bonded to the fibrous materials. If desired the coated fibrous materials may be used in plastic compositions without a filler material. Tests on glass fibers which have been treated in accordance with this invention have demonstrated that plastic compositions containing such fibers in the absence of other fillers have physical properties which are generally superior to similar compositions prepared with ordinary untreated glass fibers and a conventional filler material.

Returning now to FIG. 7, the power driven rollers 10 and 11 are arranged so as to draw a glass fiber mat 12 through the apparatus. In the first step of the process, the mat 12 is coated on its top and bottom side with an adhesive agent which is supplied from tank 13 by means of the pump 14 through conduits 15 and 16. Simultaneously, the microspheres are fed from storage bin 17 by means of a screw feeder 18 into a chamber 19 where they are subjected to an aerating gas stream produced by the introduction of a suitable gas through blower 20. The resulting suspended microspheres are transferred from chamber 19 by means of blower 21 through conduits 22 and 23 for application to the adhesive coated mat 12.

Both the steps of coating the mat 12 with adhesive and with the microspheres are conducted in a confined chamber 24 which is equipped with a solids collection system comprising the exhaust conduit 25 and a cylone separator 26. In the final step of the process, the coated mat 12 is passed into another confined chamber 27 which is equipped with a plurality of electric heating means 28 which may be infrared lamps. The heat supplied in chamber 27 cures the adhesive agent and permanently fixes the microspheres on the surfaces of the mat 12.

In carrying out the process of this invention, the first step involves the coating of the fibrous material with an appropriate adhesive agent. The method of coating is in no way critical and it may be accomplished in any convenient manner as, for example, by spraying the fibrous material with the adhesive agent or by immersing the fibrous material in a bath of the adhesive agent. In the next step of the process, the hollow glass microspheres are applied to the adhesive-bearing surfaces of the fibrous material. The method of applying the microspheres is not critical and any convenient method may be employed. One method of applying the microspheres which is very convenient involves the formation of an air suspension of the microspheres which is then sprayed directly upon the surfaces of the fibrous material.

After the application of the microspheres, the fibrous material is thermally treated in order to facilitate the rapid setting of the adhesive agent. In general, this thermal treatment involves heating the fibrous material to a temperature in the range of about 200 to 500° F. for a period of time in the range of about one to ten minutes. This heating step may be carried out in a conventional oven which is supplied with heat by electricity or by some other conventional heat source such as gas or oil.

The process may be carried out in either a batch or continuous manner with equally good results. Generally, woven fibrous materials may be handled with considerable facility in a continuous process while chopped fibrous materials are more readily treated in a batch manner.

In order to provide a specific illustrative embodiment of the process of this invention, a one ounce random glass fiber mat was coated with a liquid acrylic emulsion adhesive by spraying the mat with the emulsion in an enclosed chamber. Next, the adhesive-coated mat is sprayed with an air suspension of hollow glass microspheres which are produced according to the techniques described in U.S. Patent 2,978,339. As the final step in the process, the mat coated with the hollow glass microspheres is subjected to a temperature of 250° F. for approximately one minute in an oven and this treatment permanently fixes the microspheres to the surface of the mat.

The mat prepared in accordance with the foregoing description was employed in the manufacture of a phenolic resin laminate. Tests on this laminate revealed that it was superior to a similar laminate prepared with an untreated glass fiber mat with respect to both flexural and impact strength.

In another example of the process of this invention, a ¼ inch chopped glass fiber was coated with 12.2% by weight of glass microspheres and secured thereto with a liquid acrylic emulsion adhesive. Two samples of a reinforced plastic composition were made with a commercial polyester resin and both samples were identical except that Sample A employed conventional ¼ inch chopped glass fiber as the reinforcing agent whereas Sample B utilized ¼ inch chopped glass fiber treated in the manner specified above. The physical properties of the two samples are described in the following table:

Table I

|  | Sample A | Sample B |
|---|---|---|
| Ized Impact Strength (foot pounds per inch notch) | 2.30 | 3.62 |
| Compressive Strength (p.s.i.) | 4,450 | 6,410 |
| Modulus (p.s.i.) | $1.88 \times 10^5$ | $2.05 \times 10^5$ |
| Tensile Strength (p.s.i.) | 2,340 | 3,140 |
| Modulus (p.s.i.) | $2.83 \times 10^5$ | $3.30 \times 10^5$ |
| Flexural Strength (p.s.i.) | 12,600 | 17,900 |
| Modulus (p.s.i.) | $4.67 \times 10^6$ | $5.64 \times 10^6$ |
| Density (g./cc.) | 1.21 | 1.26 |

These data show the vastly superior physical properties of Sample B.

As further evidence of the advantage of the process and product of this invention, flexural strength tests were made on two different sections of a number of reinforced plastic samples. Samples 1, 2 and 3 were commercial products while samples 4, 5 and 6 were products made with the improved glass fiber of this invention. The results of these tests are set forth in the following table:

Table II

| Sample No. | | Flexural Strength (p.s.i.) | Percent Variation |
|---|---|---|---|
| 1 | A | 30,400 | 14.5 |
|   | B | 26,000 | |
| 2 | A | 25,800 | 7.4 |
|   | B | 23,900 | |
| 3 | A | 23,600 | 7.2 |
|   | B | 21,900 | |
| 4 | A | 26,300 | 1.1 |
|   | B | 26,000 | |
| 5 | A | 26,100 | 1.5 |
|   | B | 25,700 | |
| 6 | A | 21,000 | 2.9 |
|   | B | 20,400 | |

These data clearly show that the reinforced plastic compositions made with the glass fibers of this invention (Samples 4, 5 and 6) are much more uniform in composition than the commercial products.

Various modifications of this invention will be obvious to those skilled in the art and this application for Letters Patent is intended to cover all such modifications as would reasonably fall within the scope of the appended claims.

I claim:

1. A fiber reinforced plastic laminate comprising a fibrous glass body, a coating of adhesive on the fibers of said body, a plurality of hollow glass microspheres secured to said adhesive coating, and a laminating resinous plastic encasing said fibrous glass body, said adhesive coating, and said hollow glass microspheres.

2. The article of claim 1 wherein said laminating resinous plastic is formed from a phenol-aldehyde resin.

3. The article of claim 1 wherein said laminating resinous plastic is formed from a polyester resin.

References Cited by the Examiner

UNITED STATES PATENTS

| 2,806,509 | 9/1957 | Bozzacco et al. | 117—33 X |
| 2,885,303 | 3/1959 | Kaplan | 117—37 |
| 2,978,340 | 4/1961 | Veatch | 106—140 |
| 3,019,127 | 1/1962 | Czerwonka et al. | 117—140 X |
| 3,022,366 | 2/1962 | Kilroy | 117—126 |
| 3,061,495 | 10/1962 | Alford | 106—140 X |
| 3,062,682 | 11/1962 | Morgan et al. | 117—120 |

WILLIAM D. MARTIN, *Primary Examiner.*

RICHARD D. NEVIUS, *Examiner.*

R. E. ZIMMERMAN, S. W. ROTHSTEIN, *Assistant Examiners.*